US012782888B2

(12) United States Patent
Kotsovos et al.

(10) Patent No.: US 12,782,888 B2
(45) Date of Patent: Nov. 3, 2026

(54) PERFORMANCE FORECAST AND FAILURE PREDICTION FOR OFF-GRID SOLAR POWER SYSTEMS

(71) Applicant: Saudi Arabian Oil Company, Dhahran (SA)

(72) Inventors: Konstantinos Kotsovos, Thuwal (SA); Anas Bintin, Thuwal (SA); Issam Gereige, Thuwal (SA); Marwan H. Abdullah, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 361 days.

(21) Appl. No.: 18/543,816

(22) Filed: Dec. 18, 2023

(65) Prior Publication Data

US 2025/0199485 A1 Jun. 19, 2025

(30) Foreign Application Priority Data

Dec. 13, 2023 (GR) .............................. 20230101035

(51) Int. Cl.
*G05B 13/02* (2006.01)
*G06N 5/022* (2023.01)

(52) U.S. Cl.
CPC ......... *G05B 13/0265* (2013.01); *G06N 5/022* (2013.01)

(58) Field of Classification Search
CPC ............................ G05B 13/0265; G06N 5/022
(Continued)

(56) References Cited

U.S. PATENT DOCUMENTS 9,936,574 B2 4/2018 Rogers et al.
10,389,300 B2 8/2019 Ko et al.
(Continued)

FOREIGN PATENT DOCUMENTS

CN 104849240 8/2015
CN 204964386 1/2016
(Continued)

OTHER PUBLICATIONS

Beinert et al., "Silicon Solar Cell Integrated Stress and Temperature Sensors for Photovoltaic Modules," Progress in Photovoltaics, Feb. 2020, 28(7):717-724, 8 pages.
(Continued)

*Primary Examiner* — Kira Nguyen
(74) *Attorney, Agent, or Firm* — Fish & Richardson P.C.

(57) ABSTRACT

Disclosed are methods, systems, and computer-readable media to perform operations including: receiving, by a first machine learning model, information including one or more of: a solar panel current, a solar panel voltage, a battery current, a battery voltage, a load current, or a load voltage of the off-grid solar power system; predicting, by the first machine learning model, operating parameters of the off-grid solar power system including one or more of: a solar panel power, a solar intensity, a load profile, a battery voltage over time based on the received information; receiving, by a second machine learning model, a comparison between one or more predicted operating parameters and one or more actual operating parameters; and sending, by the second machine learning model, a user notification for an abnormal operating condition of the off-grid solar power system based on the comparison result.

20 Claims, 8 Drawing Sheets

(58) Field of Classification Search
USPC .......................................................... 700/292
See application file for complete search history.

(56) References Cited

U.S. PATENT DOCUMENTS

| | | | |
|---|---|---|---|
| 10,410,153 B2 | 9/2019 | Fife | |
| 10,811,883 B2 | 10/2020 | Silva | |
| 2009/0014057 A1 | 1/2009 | Croft et al. | |
| 2011/0273020 A1 | 11/2011 | Balachandreswaran et al. | |
| 2018/0131190 A1* | 5/2018 | Murugesan | H02S 50/00 |
| 2020/0127598 A1 | 4/2020 | Chang et al. | |
| 2020/0161291 A1 | 5/2020 | Rogers et al. | |
| 2021/0305937 A1* | 9/2021 | Kim | H02S 50/10 |
| 2021/0408967 A1 | 12/2021 | Anderegg | |
| 2022/0012644 A1* | 1/2022 | Clifton | F04B 9/14 |
| 2022/0077820 A1* | 3/2022 | Jeong | G06T 5/80 |
| 2023/0139514 A1 | 5/2023 | Tennant | |
| 2023/0198258 A1* | 6/2023 | Shi | G06Q 50/06 700/291 |
| 2024/0146060 A1* | 5/2024 | Linchieh | H02J 3/12 |
| 2024/0396498 A1* | 11/2024 | Kim | H02J 3/003 |
| 2024/0403977 A1* | 12/2024 | Valerino | G06T 7/97 |
| 2024/0429857 A1* | 12/2024 | Rakshit | G05B 13/027 |
| 2025/0062719 A1* | 2/2025 | Balawi | H02S 50/10 |

FOREIGN PATENT DOCUMENTS

| | | |
|---|---|---|
| CN | 205067342 | 3/2016 |
| CN | 105510795 | 4/2016 |
| CN | 207766215 | 8/2018 |
| CN | 110365292 | 10/2019 |
| CN | 114389531 | 4/2022 |
| DE | 102015005408 | 11/2016 |
| EP | 3885860 | 9/2021 |
| KR | 20220072961 | 6/2022 |
| TW | 201205836 | 2/2012 |
| WO | WO 2022113101 | 6/2022 |

OTHER PUBLICATIONS

Patel et al., "Design and Development of Solar Cell Integrated Moisture and Temperature Sensors for Photovoltaic Modules," Presented at the 38th Annual European PV Solar Energy Conference and Exhibition, held virtually, Sep. 6-10, 2021, 5 pages.

* cited by examiner

PERFORMANCE FORECAST AND FAILURE PREDICTION FOR OFF-GRID SOLAR POWER SYSTEMS

CROSS-REFERENCE TO RELATED APPLICATION

This application claims priority to Greek Application Serial No. 20230101035, filed Dec. 13, 2023, the contents of which is hereby incorporated by reference.

TECHNICAL FIELD

This disclosure relates generally to off-grid solar power systems.

BACKGROUND

Off-grid solar power systems are not connected to the electric grid. These systems are designed to generate electricity from sunlight and store it in batteries for use when the sun is not shining. Off-grid solar power systems are commonly used in remote areas where access to the grid is either unavailable or not cost-effective. Maintenance of off-grid solar power systems in remote areas is costly and time-consuming.

DETAILED DESCRIPTION

This disclosure describes methods and systems for monitoring and remotely controlling an off-grid solar power system. A first machine learning model is used to predict solar panel power and solar intensity over time based on one or more of a solar panel current, a solar panel voltage, a battery current, a battery voltage, a battery temperature, a load current, a load voltage, or weather data. A second machine learning model is used to compare the predicted panel power and the predicted solar intensity with an actual panel power and an actual solar intensity, respectively, so as to detect an abnormal operating condition of the off-grid solar power system. The second machine learning model is further used to notify a user of the abnormal operating condition and provide maintenance recommendations, e.g., a flight path of an Unmanned Aerial Vehicle (UAV) for detecting a malfunctioning device in the off-grid solar power system, initiating a cleaning procedure for one or more solar panels, reducing energy consumption by controlling active loads using a Battery Management System (BMS).

Some advantages of the present techniques include an improvement in monitoring and control of off-grid solar power systems using machine learning models as described herein. Identification of operating issues or failures in remote off-grid solar power systems as described herein reduces maintenance costs and technical visits to areas with limited accessibility, such as off-shore oil & gas platforms. Further, the present techniques optimize the operation of integrated energy systems, such as combined hydrogen generation with energy storage in off-grid power systems.

Figure 1:
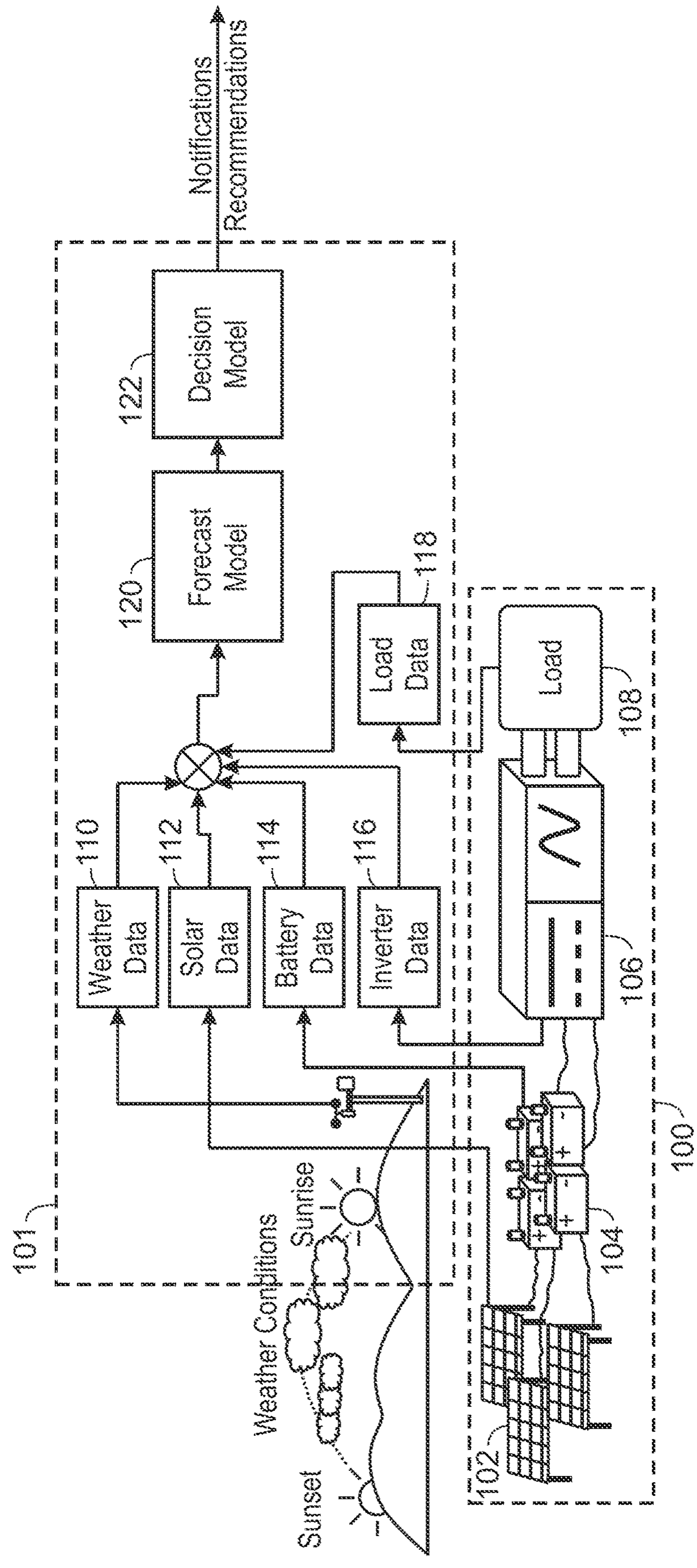
FIG. 1 illustrates an example monitoring system for an off-grid solar power system, according to some implementations.

FIG. 1 illustrates an example monitoring system for an off-grid solar power system, according to some implementations. In some implementations, the off-grid solar power system 100 includes solar panels 102, battery bank 104, inverter 106, and active loads 108. The solar panels 102 capture sunlight and convert the sunlight into electrical power through photovoltaic (PV) effect. The battery bank 104 stores excess electricity generated during the day for use at night or during cloudy days. The inverter 106 converts the direct current (DC) electrical power produced by the solar panels 102 and stored in the battery bank 104 into alternating current (AC) electrical power that can be used to power household appliances and devices. The active loads 108 include devices or components that consume electrical power or energy from the inverter 106.

In some implementations, the monitoring system 101 includes a plurality of sensors/data logging devices to acquire weather data 110, solar data 112, battery data 114, inverter data 116, and load data 118. The weather data 110 is acquired by a weather sensor. The weather data 110 can include air temperature, wind speed/direction, humidity, etc. The solar data 112 includes solar intensity, a solar panel current, and a solar panel voltage. The solar intensity is acquired by solar irradiance sensors, which are placed at the same plane and orientation as the solar panels 102. The battery data 114 includes battery parameters, such as an input/output battery current and voltage, a charging level, a battery temperature, etc. The inverter data 116 includes an inverter current and an inverter voltage. The load data 118 includes a load current and a load voltage.

The acquired data (weather data 110, solar data 112, battery data 114, inverter data 116, and load data 118) is input into forecast model 120 (a first machine learning model) for forecasting the energy output of the solar panels 102, a load profile of the active loads 108, and a battery voltage of the battery bank 104. The forecast model 120 was trained using historical data stored in a data server. The historical data includes any operating parameters of an off-grid solar power system, such as irradiance, air temperature, humidity, wind speed, wind direction, solar panel current, solar panel voltage, battery current, battery voltage, battery temperature, a load current, a load voltage, etc.

The output of the forecast model 120, e.g., the predicted energy output (the predicted solar panel power) of the solar panels 102, the predicted load profile of the active loads 108, the predicted battery voltage of the battery bank 104, and/or the predicted weather data, is input to decision model 122 (a second machine learning model). The decision model 122 compares the output of the forecast model 120 with the actual output of the off-grid solar power system to detect abnormal operating conditions of the off-grid solar power system. For example, the predicted solar panel power is compared with the actual solar panel power, the predicted load profile is compared with the actual load profile, the predicted battery voltage is compared with the actual battery voltage, and/or the predicted weather data is compared with the actual weather data. If the difference between the output of the forecast model 120 and the actual output of the off-grid solar power system is less than or equal to a threshold value, the off-grid solar power system is in a normal operating condition. On the contrary, if the difference between the output of the forecast model 120 and the actual output of the off-grid solar power system is greater than a threshold value, the off-grid solar power system is in an abnormal operating condition.

In some implementations, the forecast model 120 takes into account the source of its prediction data against the actual data. For example, weather data varies by several factors such as site (the location where the off-grid solar power system 100 is installed) orientation (e.g., North-South orientation, East-West orientation), elevation, etc. Thus, when providing a day-ahead/a week-ahead forecast, the forecast model 120 also takes into account generated residual errors and confidence intervals with respect to actual site weather data. Residual errors refer to the discrepancies or differences between measured values (e.g., actual weather data) and the predicted values (e.g., predicted weather data). A confidence interval (CI) is a statistical range or interval that is used to estimate a population parameter, such as a mean, proportion, or variance, with a certain level of confidence. It provides a way to quantify the uncertainty or variability associated with estimating a parameter (e.g., predicted weather data) based on a sample from a larger population. Confidence intervals are used to make inferences about populations based on sample data. The forecast model 120 corrects for site-specific uncertainties, such as errors related to sensor outdated calibration, weather data deviations related to the site, measurement output accuracy based on sensor datasheet specifications, other parameters related to the accuracy of the forecast model 120 (e.g., solar panel parameters used in the algorithm of the forecast model 120 or any modeling simplifications that may reduce accuracy).

If the off-grid solar power system is in an abnormal operating condition, the decision model 122 provides notifications, warnings, or alarms to a user. In some implementations, the decision model 122 further provides recommendations for the maintenance of system subcomponents. For example, notifications can include a lower solar panel power compared with the predicted solar panel power of the forecast model 120, a lower battery voltage compared with the predicted battery voltage, and/or a higher load compared with the predicted load profile. Based on each notification, decision model 122 can provide recommendations to take maintenance actions, such as cleaning the solar panel surface to increase energy output/power, adjusting the load to restore the battery voltage, etc. In some implementations, the recommendations can include a flight path of a UAV equipped with a thermal imaging device to scan a solar field of the off-grid solar power system for defective modules, and/or advanced BMS control of the active loads to reduce energy consumption when the solar panel power and/or the battery voltage are low.

In some implementations, the decision model 122 takes into account the possible causes/metrics for disruptions (e.g., the output of the forecast model 120 and its uncertainties, the maintenance history of the affected area of the plant, the age of equipment, and the average time between failure measurements, etc.). These causes/metrics are represented in maintenance data as numbers, and a combination of these metrics indicates the likelihood of operation disruption. In some implementations, the decision model 122 uses a supervised learning algorithm to minimize false alarms/notifications.

In some examples, the output of the decision model 122 is used to provide notifications, warnings, or alarms, as well as recommendations for predictive maintenance of system subcomponents to a maintenance team. In examples, the maintenance team undertakes one or more actions to correct the abnormal operating condition. Further, the present techniques enable the implementation of automated responses to abnormal operating conditions. In examples, one or more actions are implemented by control systems to correct the abnormal operating condition. Additionally, in examples, the abnormal operating conditions are used to determine a flight path of a UAV for detecting a malfunctioning device in the off-grid solar power system. In particular, the UAV is routed to malfunctioning devices associated with the abnormal operating condition. In examples, abnormal operating conditions are used to initiate a cleaning procedure for one or more solar panels 102. For example, solar panels 102 associated with abnormal operating conditions are determined to be dirty and automated cleaning procedures are carried out on the solar panels 102.

Figure 2:
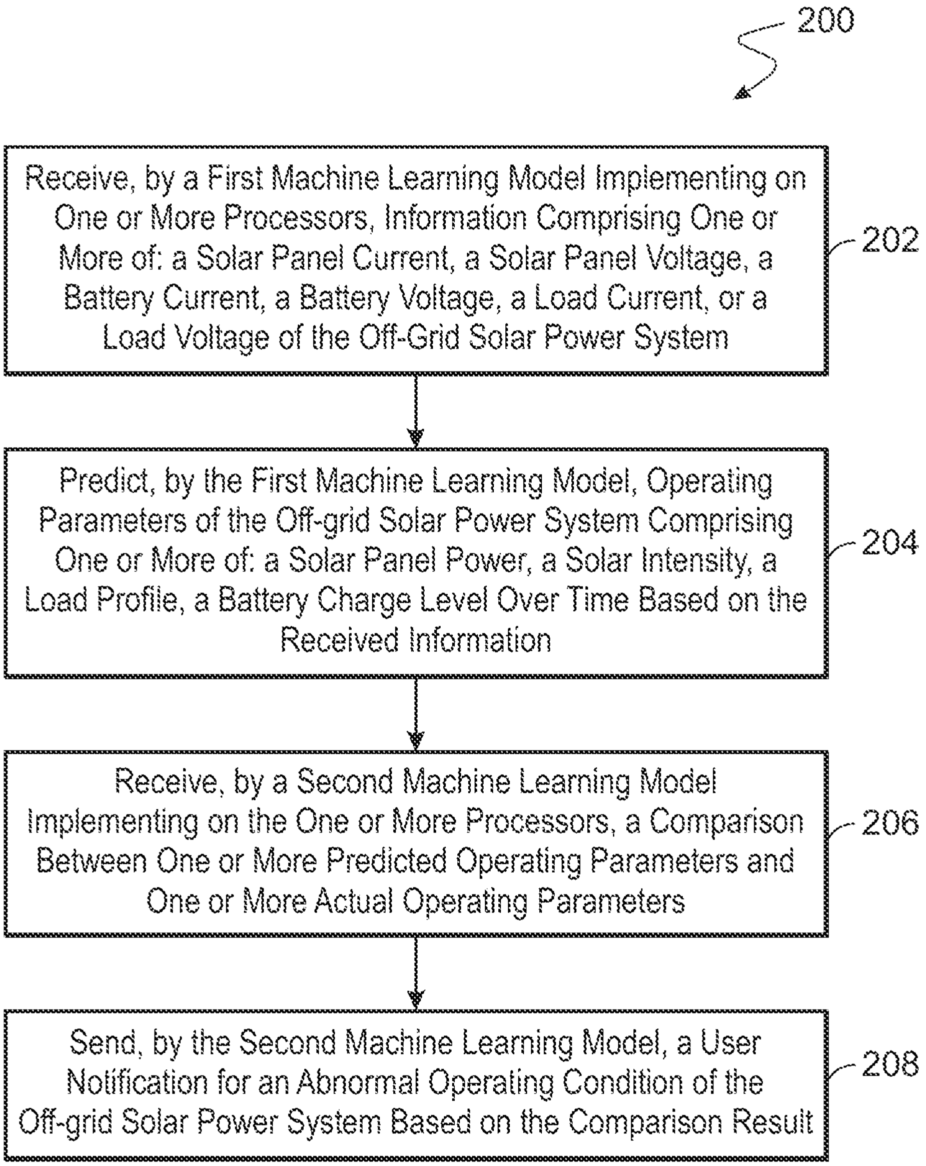
FIG. 2 illustrates a flow chart of monitoring an off-grid solar power system, according to some implementations.

FIG. 2 illustrates a flow chart of monitoring an off-grid solar power system, according to some implementations. The process 200 is described as being performed by a computing device including one or more processors or a controller, such as controller 800 of FIG. 8. The example process 200 shown in FIG. 2 can be modified or reconfigured to include additional, fewer, or different steps (not shown in FIG. 2), which can be performed in the order shown or in a different order. The first machine learning model (e.g., forecast model 120 of FIG. 1) and the second machine learning model (e.g., decision model 122 of FIG. 1) are implemented on a computing device or a controller (e.g., controller 800 of FIG. 8).

At 202, the first machine learning model receives information (historical data) including one or more of: a solar panel current, a solar panel voltage, a battery current, a battery voltage, a load current, or a load voltage. The historical data includes currently collected data and previously collected data. In some implementations, the information can further include one or more of: air temperature, wind speed, wind direction, or humidity. In some implementations, the information can further include one or more of: a battery charging level or a battery temperature. In some implementations, data cleaning is performed on the received information. For example, outliers (e.g., noisy data) are removed from the received information. Outliers are detected by statistical analysis of the historical data. For example, noisy data that lie beyond the standard deviation of the predicted daily profiles (e.g., a load profile, a battery voltage profile, a current profile, an energy output profile, etc.) are removed. Such noisy data may occur during low solar intensities (early morning or late afternoon) or can result from faulty sensor measurements (e.g., outdated calibration).

At 204, the first machine learning model predicts the operating parameters of the off-grid solar power system including one or more of: solar panel power, a solar intensity, a load profile, a battery voltage over time based on the received information. The first machine learning model can predict both solar intensity and solar panel power, which are correlated with each other. Solar intensity, which represents the amount of sunlight falling on solar panels, is one of the primary factors that influence the power generation of solar panels.

Figure 3:
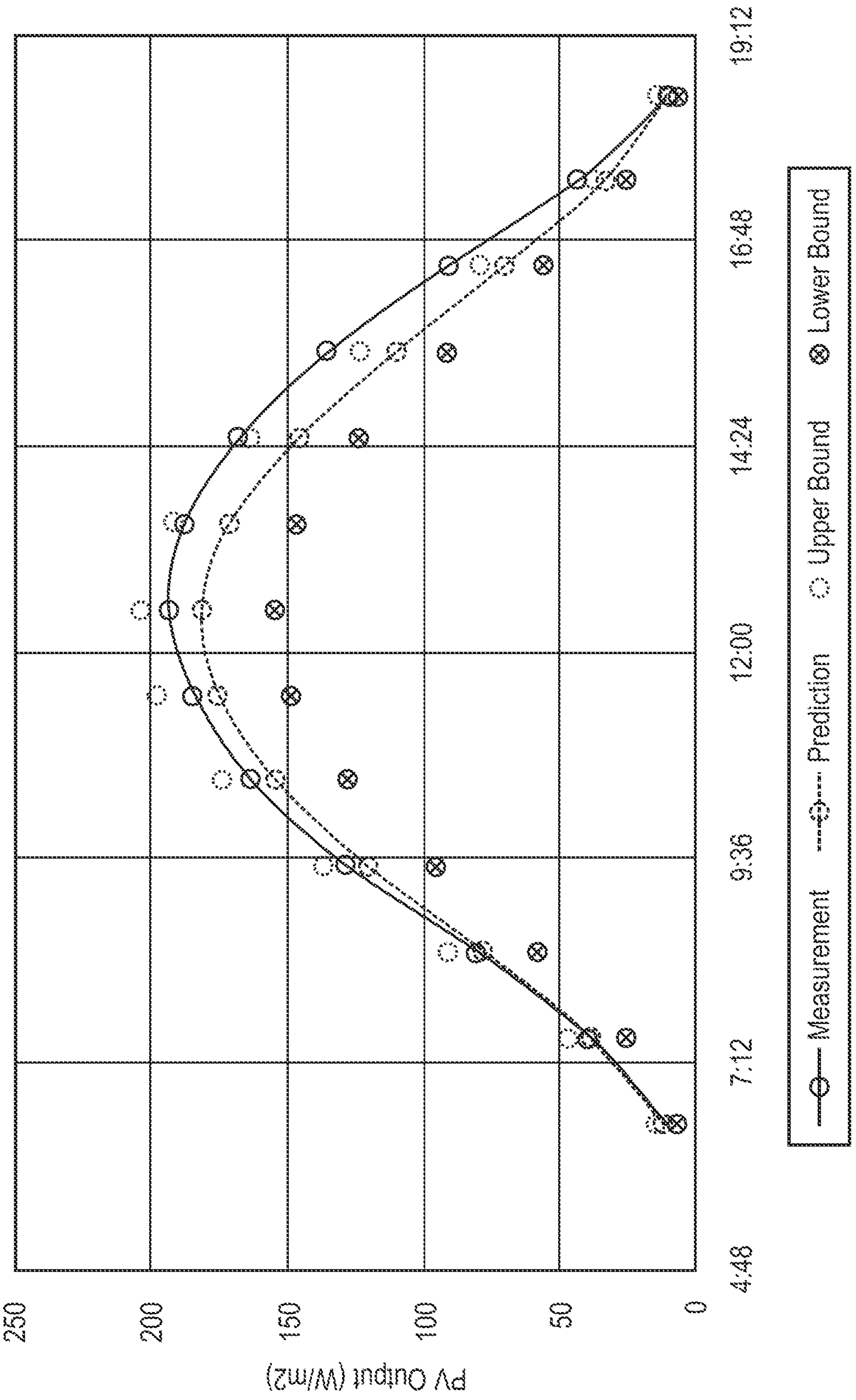
FIG. 3 illustrates an example one-day forecast of solar panel power, according to some implementations.

The first machine learning model can be a parametric model using linear regression or least squares, or a neural network. The first machine learning model can be finely tuned using historical data to account for seasonal changes or intraday variabilities to improve prediction accuracy. FIG. 3 illustrates an example one-day forecast of solar panel power, according to some implementations. "Prediction" refers to solar panel power forecast by the first machine learning model. "Measurement" refers to actual solar panel power, acquired by, e.g., a data logger or a PV power meter. The "Upper Bound" and "Lower Bound" refer to high confidence intervals (e.g., ±5%) with respect to "Prediction". Similarly, the first machine learning model can also predict an active load profile and a battery voltage profile to optimize the performance of the off-grid solar power system.

At 206, the second machine learning model receives a comparison between one or more predicted operating parameters and one or more actual operating parameters. The second machine learning model compares the predicted operating parameters with actual operating parameters to check if there is a significant deviation. The actual operating parameters are acquired by corresponding sensors/data logging devices. If the difference between the predicted operating parameters and the actual operating parameters is less than or equal to a threshold value, the off-grid solar power system is in a normal operating condition. On the contrary, if the difference between the predicted operating parameters and the actual operating parameters is greater than a threshold value, the off-grid solar power system is in an abnormal operating condition.

At 208, the second machine learning model sends a user notification for an abnormal operating condition of the off-grid solar power system based on the comparison result. A user of the off-grid solar power system, e.g., maintenance personnel is alerted to the abnormal operating condition, e.g., dirty solar panels. In some implementations, the second machine learning model further provides maintenance recommendations, e.g., a flight path of UAV for detecting a malfunctioning device in the off-grid solar power system, initiating a cleaning procedure for solar panels, or reducing energy consumption by controlling active loads using a BMS, etc.

Figure 4:
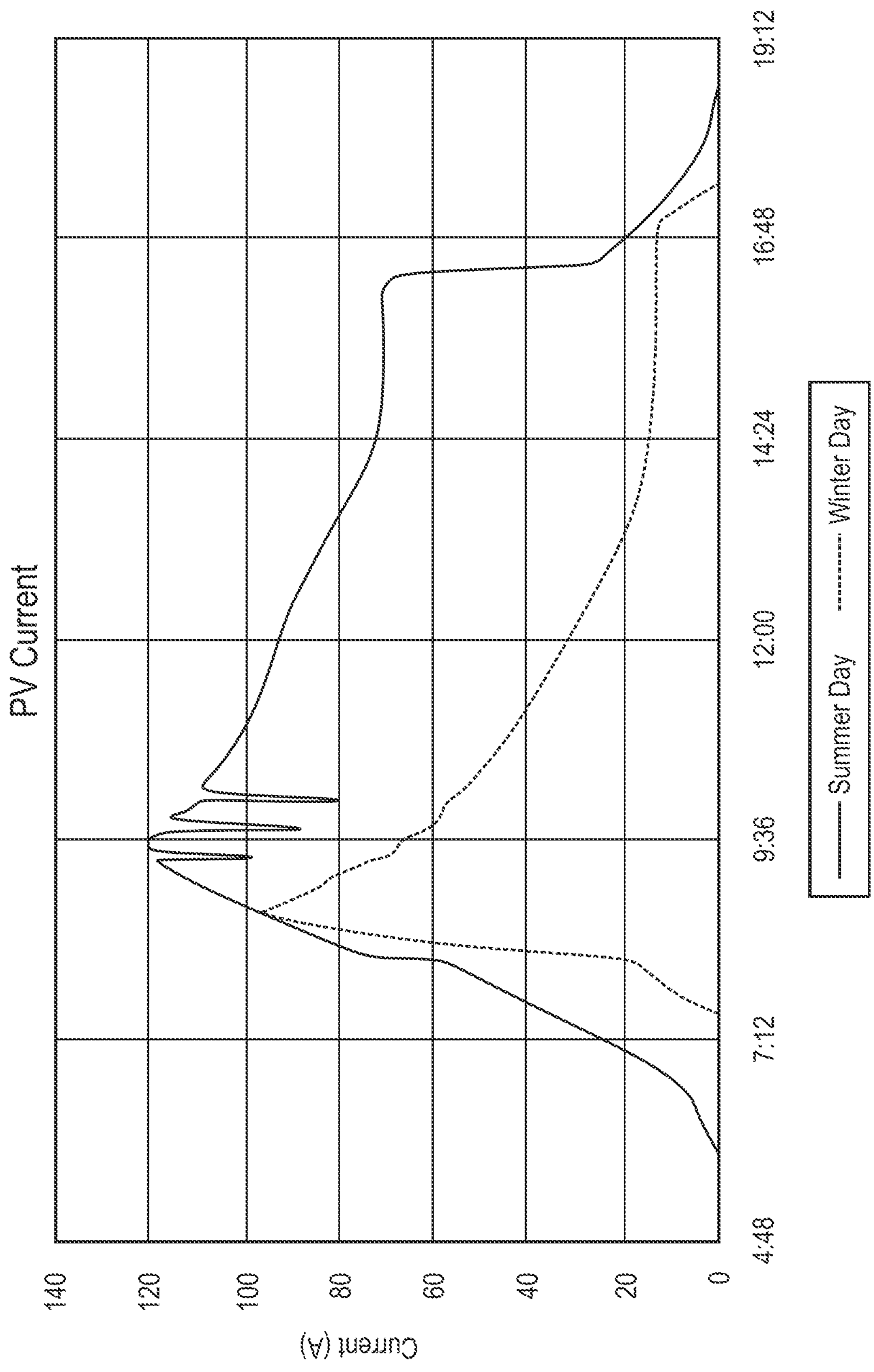
FIG. 4 illustrates an example one-day measurement of a solar panel current, according to some implementations.
Figure 5:
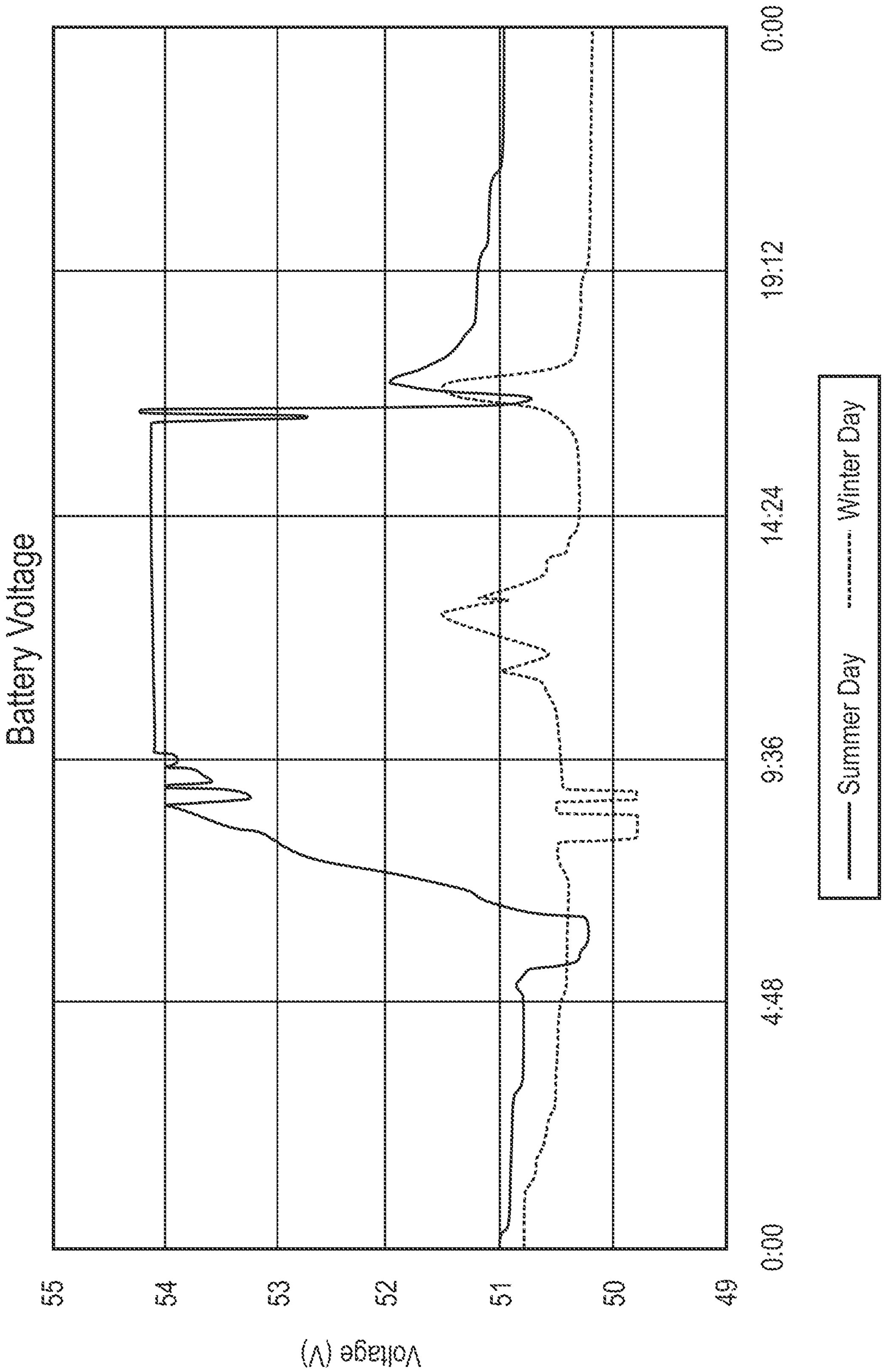
FIG. 5 illustrates an example one-day measurement of a battery voltage, according to some implementations.

For example, the predicted solar panel power is 1000 W, the upper bound is 1050 W, and the lower bound is 950 W. The actual solar panel power is 500 W, which is significantly below the lower bound, and thus a warning is sent to a user, because the solar panels may be dirty and require cleaning. For another example, an actual solar intensity is also compared with the predicted solar intensity. If the actual solar intensity is below the predicted solar intensity due to unforeseen weather changes (e.g., sudden rainstorms or excessive cloud formation) and the solar panels are consistently underperforming for a particular time period, the second machine learning model can trigger an alarm for maintenance system inspection. For another example, if a battery voltage falls below a particular level, a warning or alarm can be sent to a user. FIGS. 4-5 illustrate an example one-day measurement of a solar panel current and an example one-day measurement of a battery voltage under two different conditions (overcast winter day and sunny summer day), respectively. As shown in FIGS. 4 and 5, the battery bank reaches a full charge during the sunny summer day, while sunlight intensity was insufficient for charging during the overcast winter day (a low solar panel current as shown in FIG. 4). In addition, during night period in winter day, the battery voltage reaches a lower voltage level compared to early morning hours prior to solar charge. In this scenario, the second machine learning model can send a message to a user, e.g., an operator, informing that a battery voltage is lower than the predicted battery voltage, as well as providing suggestions for load optimization to reduce energy consumption.

Figure 6:
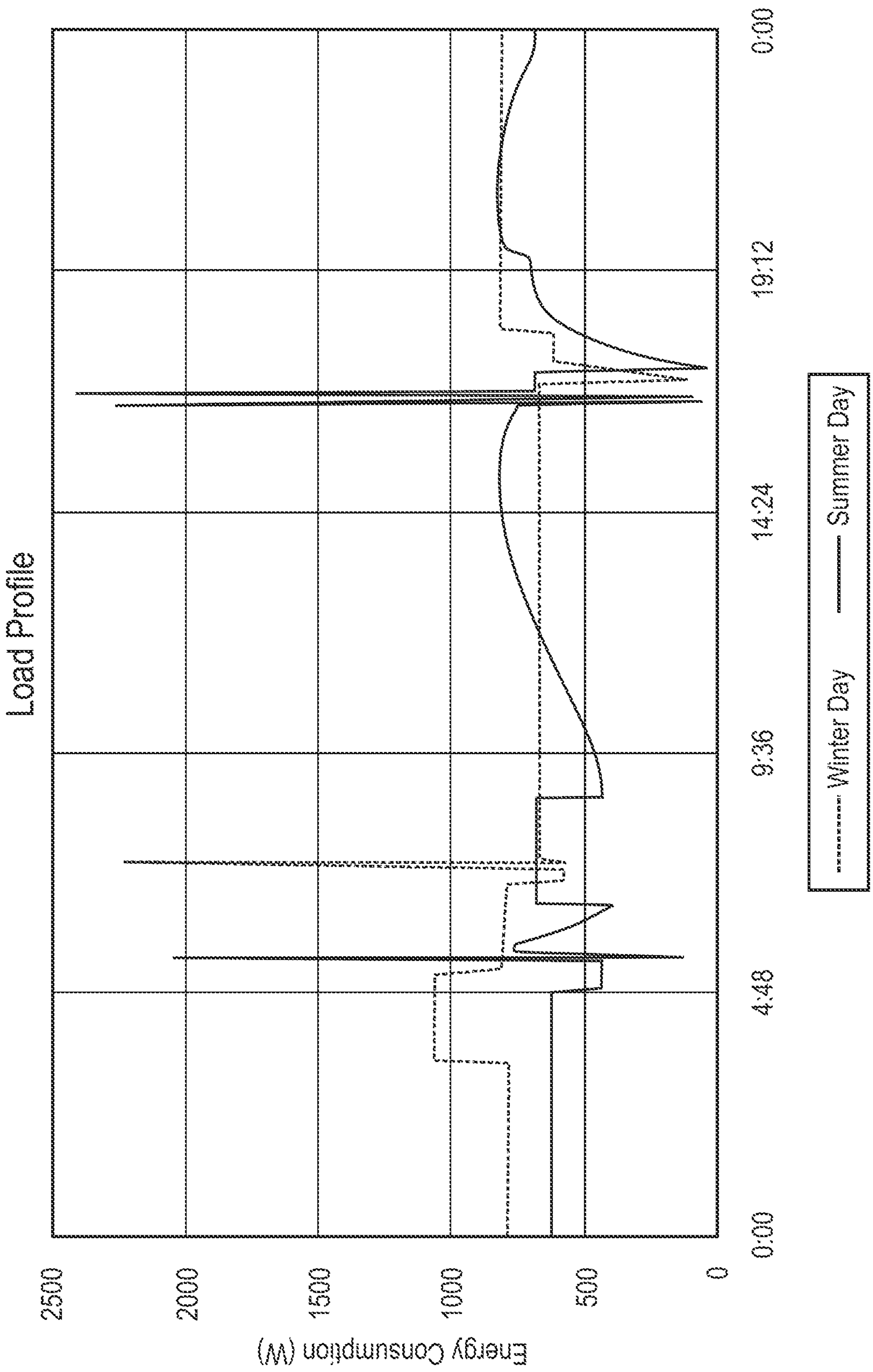
FIG. 6 illustrates an example one-day measurement of a load profile, according to some implementations.

In some implementations, the first machine learning model can predict a load profile. FIG. 6 illustrates an example one-day measurement of a load profile, according to some implementations. As shown in FIG. 6, the power consumption of active loads during early morning hours (12:00 AM till 7:00 AM) is significantly higher during the overcast winter day. Accordingly, the second machine learning model can provide a suggestion to cut off the power of non-critical devices or switch off lights in particular areas when unnecessary.

In some implementations, the first machine learning model can predict solar panel power, battery voltage level, and load profile based on weather data. For example, strong winds, dust storms, and cloudy conditions are used for prediction.

In some implementations, the second machine learning model provides maintenance recommendations to optimize performance of the off-grid solar power system. The second machine learning model can identify or rectify malfunctions of the off-grid solar power system, such as initiating a solar panel cleaning procedure, utilizing a UAV with an integrated thermal imager to scan the solar field for defective modules, and utilizing advanced BMS control of active loads to reduce energy consumption in case of low power generation efficiency or a low battery voltage level. For example, the solar panel cleaning procedure is activated through automated techniques, such as robotic cleaning, automatic water sprinklers, etc. If one or more photovoltaic (PV) strings including a group of solar panels generate power significantly less than the predicted solar panel power, a UAV equipped with a thermal imager can be deployed to inspect PV strings for any malfunction (e.g., higher temperature in one or more local regions of PV strings). For another example, the UAV can detect inverter failures including overheating, failure to restart after grid faults, and isolation faults. The inverter-related failures are utilized to inform the user of the type and location of the faults, saving a significant amount of time taken for reactive maintenance.

In some implementations, the second machine learning model can provide a flight path of UAVs for detecting malfunctions. The flight path can be updated based on continuous data input into the first machine learning model.

Figure 7:
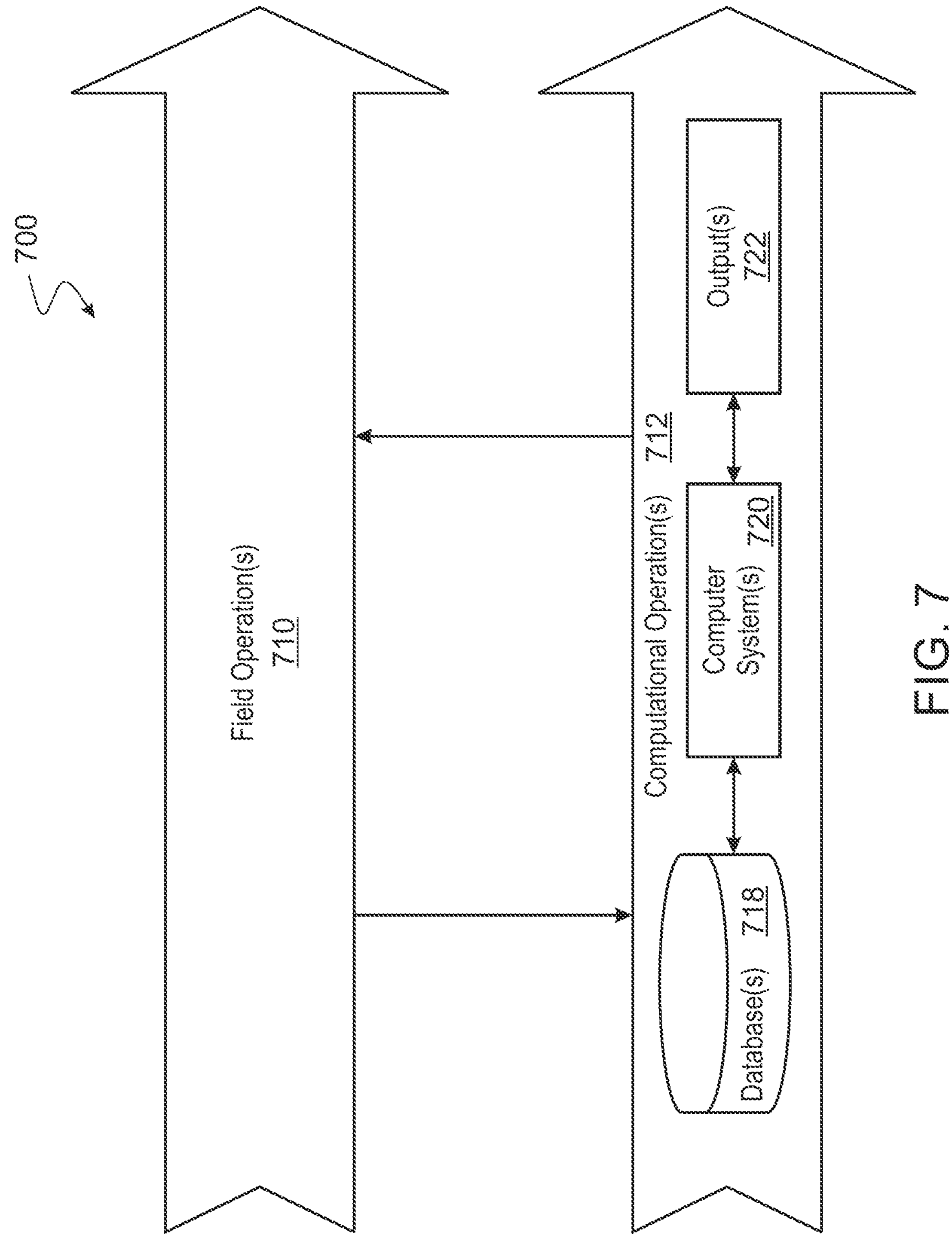
FIG. 7 illustrates hydrocarbon production operations that include both one or more field operations and one or more computational operations, which exchange information and control exploration for the production of hydrocarbons.

FIG. 7 illustrates hydrocarbon production operations 700 that include both one or more field operations 710 and one or more computational operations 712, which exchange information and control exploration for the production of hydrocarbons. In some implementations, outputs of techniques of the present disclosure can be performed before, during, or in combination with the hydrocarbon production operations 700, specifically, for example, either as field operations 710 or computational operations 712, or both.

Examples of field operations 710 include forming/drilling a wellbore, hydraulic fracturing, producing through the wellbore, injecting fluids (such as water) through the wellbore, to name a few. In some implementations, methods of the present disclosure can trigger or control the field operations 710. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 710 and responsively triggering the field operations 710 including, for example, generating plans and signals that provide feedback to and control physical components of the field operations 710. Alternatively or in addition, the field operations 710 can trigger the methods of the present disclosure. For example, implementing physical components (including, for example, hardware, such as sensors) deployed in the field operations 710 can generate plans and signals that can be provided as input or feedback (or both) to the methods of the present disclosure.

Examples of computational operations 712 include one or more computer systems 720 that include one or more processors and computer-readable media (e.g., non-transitory computer-readable media) operatively coupled to the one or more processors to execute computer operations to perform the methods of the present disclosure. The computational operations 712 can be implemented using one or more databases 718, which store data received from the field operations 710 and/or generated internally within the computational operations 712 (e.g., by implementing the methods of the present disclosure) or both. For example, the one or more computer systems 720 process inputs from the field operations 710 to assess conditions in the physical world, the outputs of which are stored in the databases 718. For example, seismic sensors of the field operations 710 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 712 where they are stored in the databases 718 and analyzed by the one or more computer systems 720.

In some implementations, one or more outputs 722 generated by the one or more computer systems 720 can be provided as feedback/input to the field operations 710 (either as direct input or stored in the databases 718). The field operations 710 can use the feedback/input to control physical components used to perform the field operations 710 in the real world.

For example, the computational operations 712 can process the seismic data to generate three-dimensional (3D) maps of the subsurface formation. The computational operations 712 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 712 to process new information about the formation and control the drilling to adjust to the observed conditions in real-time.

The one or more computer systems 720 can update the 3D maps of the subsurface formation as information from one exploration well is received and the computational operations 712 can adjust the location of the next exploration well based on the updated 3D maps. Similarly, the data received from production operations can be used by the computational operations 712 to control components of the production operations. For example, production well and pipeline data can be analyzed to predict slugging in pipelines leading to a refinery and the computational operations 712 can control machine operated valves upstream of the refinery to reduce the likelihood of plant disruptions that run the risk of taking the plant offline.

In some implementations of the computational operations 712, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 8:
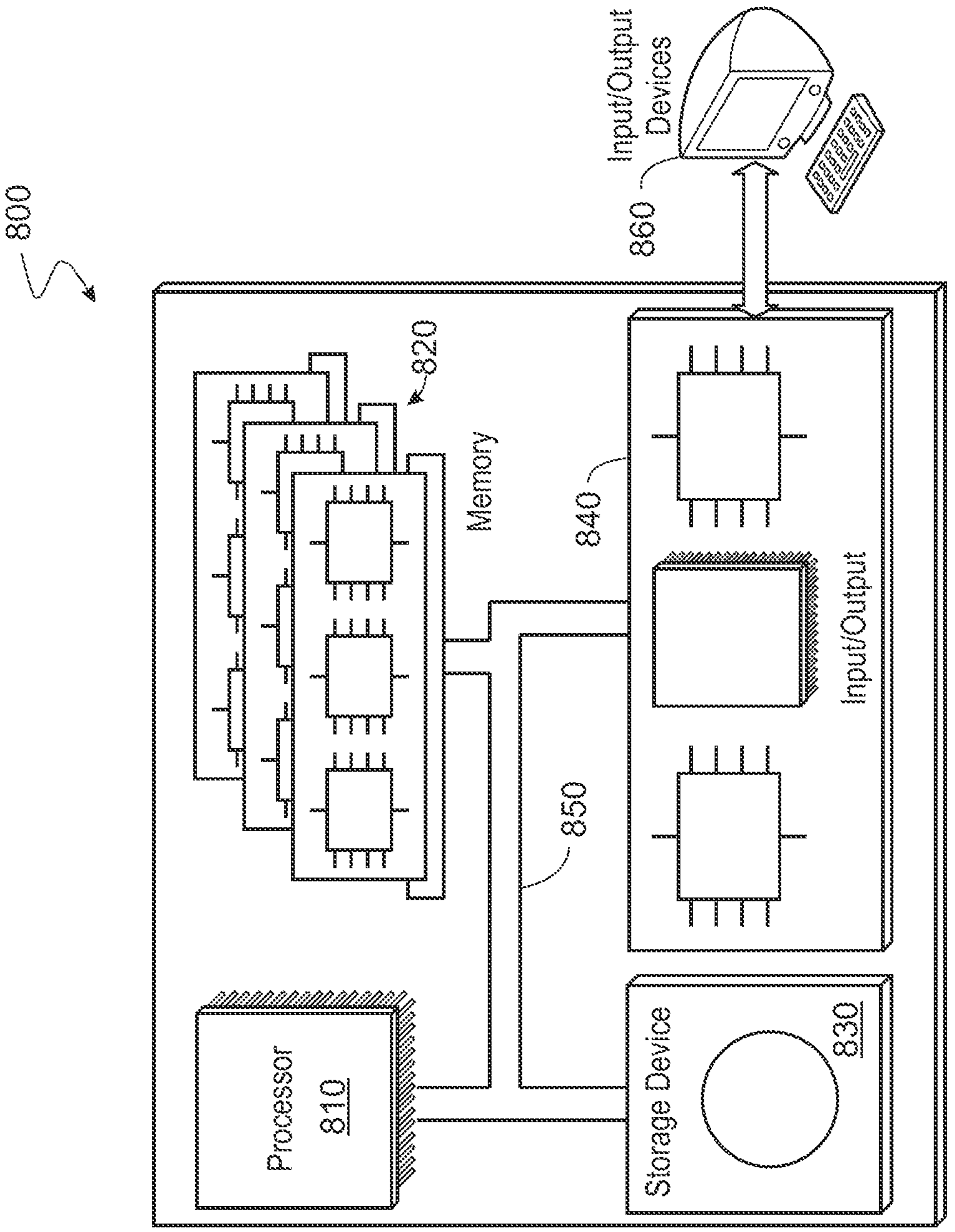
FIG. 8 is a schematic illustration of an example controller (or control system) that enables monitoring an off-grid solar power system.

FIG. 8 is a schematic illustration of an example controller 800 (or control system) that enables monitoring an off-grid solar power system. For example, the controller 800 may be operable according to the process 200 of FIG. 2. The controller 800 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 800 includes a processor 810, a memory 820, a storage device 830, and an input/output interface 840 communicatively coupled with input/output devices 860 (for example, displays, keyboards, measurement devices, sensors, valves, pumps). Each of the components 810, 820, 830, and 840 are interconnected using a system bus 850. The processor 810 is capable of processing instructions for execution within the controller 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output interface 840.

The memory 820 stores information within the controller 800. In one implementation, the memory 820 is a computer-readable medium. In one implementation, the memory 820 is a volatile memory unit. In another implementation, the memory 820 is a nonvolatile memory unit.

The storage device 830 is capable of providing mass storage for the controller 800. In one implementation, the storage device 830 is a computer-readable medium. In various different implementations, the storage device 830 may be a floppy disk device, a hard disk device, an optical disk device, or a tape device.

The input/output interface 840 provides input/output operations for the controller 800. In one implementation, the input/output devices 860 includes a keyboard and/or pointing device. In another implementation, the input/output devices 860 includes a display unit for displaying graphical user interfaces.

There can be any number of controllers 800 associated with, or external to, a computer system containing controller 800, with each controller 800 communicating over a network. Further, the terms "client," "user," and other appropriate terminology can be used interchangeably, as appropriate, without departing from the scope of the present disclosure. Moreover, the present disclosure contemplates that many users can use one controller 800 and one user can use multiple controllers 800.

EMBODIMENTS/EXAMPLES

According to some non-limiting embodiments or examples, provided is a computer-implemented method, for monitoring an off-grid solar power system, comprising: receiving, by a first machine learning model implementing on one or more processors, information comprising one or more of: a solar panel current, a solar panel voltage, a battery current, a battery voltage, a load current, or a load voltage of the off-grid solar power system; predicting, by the first machine learning model, operating parameters of the off-grid solar power system comprising one or more of: a solar panel power, a solar intensity, a load profile, a battery voltage over time based on the received information; receiving, by a second machine learning model implementing on the one or more processors, a comparison between one or more predicted operating parameters and one or more actual operating parameters; and sending, by the second machine learning model, a user notification for an abnormal operating condition of the off-grid solar power system based on the comparison result.

According to some non-limiting embodiments or examples, provided is an apparatus comprising a non-transitory, computer readable, storage medium that stores instructions that, when executed by at least one processor, cause the at least one processor to perform operations comprising: receiving, by a first machine learning model implementing on one or more processors, information comprising one or more of: a solar panel current, a solar panel voltage, a battery current, a battery voltage, a load current, or a load voltage of the off-grid solar power system; predicting, by the first machine learning model, operating parameters of the off-grid solar power system comprising one or more of: a solar panel power, a solar intensity, a load profile, a battery voltage over time based on the received information; receiving, by a second machine learning model implementing on the one or more processors, a comparison between one or more predicted operating parameters and one or more actual operating parameters; and sending, by the second machine learning model, a user notification for an abnormal operating condition of the off-grid solar power system based on the comparison result.

According to some non-limiting embodiments or examples, provided is a system, comprising: one or more memory modules; one or more hardware processors communicably coupled to the one or more memory modules, the one or more hardware processors configured to execute instructions stored on the one or more memory models to perform operations comprising: receiving, by a first machine learning model implementing on one or more processors, information comprising one or more of: a solar panel current, a solar panel voltage, a battery current, a battery voltage, a load current, or a load voltage of the off-grid solar power system; predicting, by the first machine learning model, operating parameters of the off-grid solar power system comprising one or more of: a solar panel power, a solar intensity, a load profile, a battery voltage over time based on the received information; receiving, by a second machine learning model implementing on the one or more processors, a comparison between one or more predicted operating parameters and one or more actual operating parameters; and sending, by the second machine learning model, a user notification for an abnormal operating condition of the off-grid solar power system based on the comparison result.

Further non-limiting aspects or embodiments are set forth in the following numbered embodiments:

Embodiment 1: A computer-implemented method for monitoring an off-grid solar power system, comprising: receiving, by a first machine learning model implementing on one or more processors, information comprising one or more of: a solar panel current, a solar panel voltage, a battery current, a battery voltage, a load current, or a load voltage of the off-grid solar power system; predicting, by the first machine learning model, operating parameters of the off-grid solar power system comprising one or more of: a solar panel power, a solar intensity, a load profile, a battery voltage over time based on the received information; receiving, by a second machine learning model implementing on the one or more processors, a comparison between one or more predicted operating parameters and one or more actual operating parameters; and sending, by the second machine learning model, a user notification for an abnormal operating condition of the off-grid solar power system based on the comparison result.

Embodiment 2: The computer-implemented method of Embodiment 1, further comprising providing, by the second machine learning model, one or more maintenance recommendations based on the abnormal operating condition.

Embodiment 3: The computer-implemented method of Embodiment 2, the one or more maintenance recommendations comprise a flight path of Unmanned Aerial Vehicle (UAV) for detecting a malfunctioning device in the off-grid solar power system.

Embodiment 4: The computer-implemented method of Embodiment 2, the one or more maintenance recommendations comprise initiating a cleaning procedure for one or more solar panels.

Embodiment 5: The computer-implemented method of Embodiment 2, the one or more maintenance recommendations comprise reducing energy consumption by controlling active loads using a Battery Management System (BMS).

Embodiment 6: The computer-implemented method of any one of previous Embodiments, wherein the information further comprises one or more of: an air temperature, a wind speed, a wind direction, or a humidity.

Embodiment 7: The computer-implemented method of any one of previous Embodiments, wherein the information further comprises one or more of: a battery charging level, or a battery temperature.

Embodiment 8: The computer-implemented method of any one of previous Embodiments, further comprising removing outliers from the information.

Embodiment 9: An apparatus comprising a non-transitory, computer readable, storage medium that stores instructions that, when executed by at least one processor, cause the at least one processor to perform operations comprising: receiving, by a first machine learning model implementing on one or more processors, information comprising one or more of: a solar panel current, a solar panel voltage, a battery current, a battery voltage, a load current, or a load voltage of the off-grid solar power system; predicting, by the first machine learning model, operating parameters of the off-grid solar power system comprising one or more of: a solar panel power, a solar intensity, a load profile, a battery voltage over time based on the received information; receiving, by a second machine learning model implementing on the one or more processors, a comparison between one or more predicted operating parameters and one or more actual operating parameters; and sending, by the second machine learning model, a user notification for an abnormal operating condition of the off-grid solar power system based on the comparison result.

Embodiment 10: The apparatus of Embodiment 9, the operations further comprising providing, by the second machine learning model, one or more maintenance recommendations based on the abnormal operating condition.

Embodiment 11: The apparatus of Embodiment 10, the one or more maintenance recommendations comprise a flight path of Unmanned Aerial Vehicle (UAV) for detecting a malfunctioning device in the off-grid solar power system.

Embodiment 12: The apparatus of Embodiment 10, the one or more maintenance recommendations comprise initiating a cleaning procedure for one or more solar panels.

Embodiment 13: The apparatus of Embodiment 10, the one or more maintenance recommendations comprise reducing energy consumption by controlling active loads using a Battery Management System (BMS).

Embodiment 14: The apparatus of any one of Embodiments 9-13, wherein the information further comprises one or more of: an air temperature, a wind speed, a wind direction, or a humidity.

Embodiment 15: The apparatus of any one of Embodiments 9-14, wherein the information further comprises one or more of: a battery charging level, or a battery temperature.

Embodiment 16: The apparatus of any one of Embodiments 9-15, the operations further comprising removing outliers from the information.

Embodiment 17: A system, comprising: one or more memory modules; one or more hardware processors communicably coupled to the one or more memory modules, the one or more hardware processors configured to execute instructions stored on the one or more memory models to perform operations comprising: receiving, by a first machine learning model implementing on one or more processors, information comprising one or more of: a solar panel current, a solar panel voltage, a battery current, a battery voltage, a load current, or a load voltage of the off-grid solar power system; predicting, by the first machine learning model, operating parameters of the off-grid solar power system comprising one or more of: a solar panel power, a solar intensity, a load profile, a battery voltage over time based on the received information; receiving, by a second machine learning model implementing on the one or more processors, a comparison between one or more predicted operating parameters and one or more actual operating parameters; and sending, by the second machine learning model, a user notification for an abnormal operating condition of the off-grid solar power system based on the comparison result.

Embodiment 18: The system of Embodiment 17, the operations further comprising providing, by the second machine learning model, one or more maintenance recommendations based on the abnormal operating condition.

Embodiment 19: The system of Embodiment 17 or 18, wherein the information further comprises one or more of: an air temperature, a wind speed, a wind direction, or a humidity.

Embodiment 20: The system of any one of Embodiments 17-19, the operations further comprising removing outliers from the information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Various components may be described as performing a task or tasks, for convenience in the description. Such descriptions should be interpreted as including the phrase "configured to." Reciting a component that is configured to perform one or more tasks is expressly intended not to invoke 35 USC § 112(f) interpretation for that component.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

We claim:

1. A computer-implemented method comprising:

executing a first machine learning model trained to predict one or more operating parameters of an off-grid solar power system, the executing comprising providing one or more of weather data, solar data, battery data, inverter data, and load data, to the first machine learning model as input;

executing a second machine learning model, different than the first machine learning model, trained to detect an abnormal operating condition, the executing of the second machine learning model comprising providing at least one output of the first machine learning model for comparison by the second machine learning model and detecting, by the second machine learning model, an abnormal operating condition of the off-grid solar power system based on a comparison result with the output of the first machine learning model; and performing one or more actions in response to detecting, by the second machine learning model, the abnormal operating condition of the off-grid solar power system.

2. The computer-implemented method of claim 1, wherein performing the one or more actions comprises:

providing one or more maintenance recommendations based on the abnormal operating condition.

3. The computer-implemented method of claim 1, wherein performing the one or more actions comprises:

providing data indicating a flight path for an Unmanned Aerial Vehicle (UAV) to detect a malfunctioning device in the off-grid solar power system.

4. The computer-implemented method of claim 1, wherein performing the one or more actions comprises:

initiating a cleaning procedure for one or more solar panels.

5. The computer-implemented method of claim 1, wherein performing the one or more actions comprises:

controlling a Battery Management System (BMS) to reduce energy consumption of an active load of the off-grid solar power system.

6. The computer-implemented method of claim 1, wherein the weather data comprises one or more of: an air temperature, a wind speed, a wind direction, or a humidity.

7. The computer-implemented method of claim 1, wherein the battery data comprises one or more of: a battery charging level, or a battery temperature.

8. The computer-implemented method of claim 1, wherein performing the one or more actions comprises:

generating a flight path for an Unmanned Aerial Vehicle (UAV); and routing the UAV to a malfunctioning device associated with the detected abnormal operating condition.

9. The computer-implemented method of claim 1, wherein executing the first machine learning model comprises:

generating residual errors and confidence intervals with respect to the weather data to correct for site-specific uncertainties comprising sensor calibration errors.

10. The computer-implemented method of claim 1, wherein the second machine learning model uses a supervised learning algorithm configured to minimize false alarms by evaluating maintenance data of an area of the off-grid solar power system.

11. The computer-implemented method of claim 1, wherein the executing of the second machine learning model comprises:

providing two outputs of the first machine learning model for comparison by the second machine learning model;

comparing, by the second machine learning model, data including the two outputs of the first machine learning model; and detecting, by the second machine learning model, the abnormal operating condition of the off-grid solar power system based on a comparison result of the data including the two outputs of the first machine learning model.

12. An apparatus comprising a non-transitory, computer readable, storage medium that stores instructions that, when executed by at least one processor, cause the at least one processor to perform operations comprising:

executing a first machine learning model trained to predict one or more operating parameters of an off-grid solar power system, the executing comprising providing one or more of weather data, solar data, battery data, inverter data, and load data, to the first machine learning model as input;

executing a second machine learning model, different than the first machine learning model, trained to detect an abnormal operating condition, the executing of the second machine learning model comprising providing at least one output of the first machine learning model for comparison by the second machine learning model and detecting, by the second machine learning model, an abnormal operating condition of the off-grid solar power system based on a comparison result with the output of the first machine learning model; and performing one or more actions in response to detecting, by the second machine learning model, the abnormal operating condition of the off-grid solar power system.

13. The apparatus of claim 12, wherein performing the one or more actions comprises:

providing one or more maintenance recommendations based on the abnormal operating condition.

14. The apparatus of claim 12, wherein performing the one or more actions comprises:

providing data indicating a flight path for an Unmanned Aerial Vehicle (UAV) to detect a malfunctioning device in the off-grid solar power system.

15. The apparatus of claim 12, wherein performing the one or more actions comprises:

initiating a cleaning procedure for one or more solar panels.

16. The apparatus of claim 12, wherein performing the one or more actions comprises:

controlling a Battery Management System (BMS) to reduce energy consumption of an active load of the off-grid solar power system.

17. The apparatus of claim 12, wherein the battery data comprises one or more of: a battery charging level, or a battery temperature.

18. A system comprising:

one or more memory modules;

one or more hardware processors communicably coupled to the one or more memory modules, the one or more hardware processors configured to execute instructions stored on the one or more memory modules to perform operations comprising:

executing a first machine learning model trained to predict one or more operating parameters of an off-grid solar power system, the executing comprising providing one or more of weather data, solar data, battery data, inverter data, and load data, to the first machine learning model as input;

executing a second machine learning model, different than the first machine learning model, trained to detect an abnormal operating condition, the executing of the second machine learning model comprising providing at least one output of the first machine learning model for comparison by the second machine learning model and detecting, by the second machine learning model, an abnormal operating condition of the off-grid solar power system based on a comparison result with the output of the first machine learning model; and performing one or more actions in response to detecting, by the second machine learning model, the abnormal operating condition of the off-grid solar power system.

19. The system of claim 18, wherein performing the one or more actions comprises:

providing one or more maintenance recommendations based on the abnormal operating condition.

20. The system of claim 18, wherein the weather data comprises one or more of: an air temperature, a wind speed, a wind direction, or a humidity.

* * * * *